(12) United States Patent
Morgan

(10) Patent No.: US 9,636,793 B2
(45) Date of Patent: May 2, 2017

(54) PART FIXTURING DEVICE WITH ADJUSTABLE POSITIONING

(71) Applicant: John Morgan, Nashville, TN (US)

(72) Inventor: John Morgan, Nashville, TN (US)

( * ) Notice: Subject to any disclaimer, the term of this patent is extended or adjusted under 35 U.S.C. 154(b) by 154 days.

(21) Appl. No.: 14/046,803

(22) Filed: Oct. 4, 2013

(65) Prior Publication Data

US 2015/0097327 A1    Apr. 9, 2015

(51) Int. Cl.
  *B23Q 3/18*   (2006.01)
  *B23Q 16/00*  (2006.01)
  *B23Q 16/02*  (2006.01)

(52) U.S. Cl.
  CPC ............. *B23Q 16/001* (2013.01); *B23Q 3/18* (2013.01); *B23Q 16/024* (2013.01)

(58) Field of Classification Search
  CPC ..... B25B 11/002; B25B 11/005; B25B 11/00; B25B 5/14; B23C 3/103; B23C 3/18
  See application file for complete search history.

(56) References Cited

U.S. PATENT DOCUMENTS

| | | | | |
|---|---|---|---|---|
| 3,504,723 A * | 4/1970 | Cushman | ................ | F16B 5/01 29/513 |
| 3,691,883 A * | 9/1972 | Ingram | ................ | B23B 23/00 279/143 |
| 3,833,210 A * | 9/1974 | Kotter | ................ | B25B 5/163 269/170 |
| 4,471,331 A * | 9/1984 | Wyatt | ................ | B23Q 3/1546 310/90.5 |
| 4,530,493 A * | 7/1985 | Break | ................ | B25B 5/10 269/93 |
| 4,794,687 A * | 1/1989 | Peters | ................ | B23Q 3/103 269/900 |
| 4,861,011 A * | 8/1989 | Varga | ................ | B23Q 3/102 269/287 |
| 5,107,599 A | 4/1992 | Marincic et al. | | |
| 5,516,089 A * | 5/1996 | Seniff | ................ | B23Q 3/102 269/304 |
| 6,489,871 B1 * | 12/2002 | Barton | ................ | 335/285 |
| 6,877,729 B2 | 4/2005 | Lin et al. | | |
| 7,036,810 B2 * | 5/2006 | Wal, III | ................ | 269/296 |
| 7,395,607 B1 | 7/2008 | Broderick et al. | | |
| 7,614,602 B2 | 11/2009 | Hutter, III | | |
| 7,862,258 B2 | 1/2011 | Meyers et al. | | |

(Continued)

*Primary Examiner* — Larry E Waggle, Jr.
*Assistant Examiner* — Seahee Yoon
(74) *Attorney, Agent, or Firm* — PatentBest; Andrew McAleavey

(57) ABSTRACT

Fixturing elements for positioning components on a work surface with a fixed or variable pitch are disclosed. The fixturing elements include a bottom portion adapted to be coupled directly or indirectly to the work surface and a top portion with a generally horizontally-extending slot or track. An insert is adapted to be positioned within the slot or track, which allows the insert to be slid or positioned at any number of positions along the slot or track. The insert may, for example, include a vertically-extending pin or a threaded hole that is adapted to receive other components. In some embodiments, the fixturing element may include an exterior side slot that opens into the slot or track, and a handle element may be inserted through the side slot and into the insert, allowing the inserted to be positioned using the handle element.

15 Claims, 4 Drawing Sheets

(56) References Cited

U.S. PATENT DOCUMENTS

| | | |
|---|---|---|
| 8,137,031 B2 | 3/2012 | Meyers et al. |
| 8,854,829 B1 * | 10/2014 | Bopp ..................... H05K 7/142 |
| | | 174/382 |
| 2007/0107181 A1 | 5/2007 | Vau |
| 2011/0147555 A1 * | 6/2011 | Harris et al. ............... 248/286.1 |
| 2013/0161890 A1 * | 6/2013 | Tseng .................... B23Q 3/104 |
| | | 269/152 |
| 2013/0175751 A1 * | 7/2013 | Canuto ........................ 269/311 |

* cited by examiner

PART FIXTURING DEVICE WITH ADJUSTABLE POSITIONING

BACKGROUND OF THE INVENTION

1. Field of the Invention

In general, the present invention relates to workholding and fixturing devices for holding parts, and more particularly, to fixturing devices for holding parts in coordinate measuring machines and other apparatuses.

2. Description of Related Art

Coordinate measuring machines (CMMs) are precision instruments used to measure the physical, geometrical properties of items. A CMM usually includes a work surface with a grid of threaded holes at a defined, regular pitch for fixturing parts, and a mechanism that actually takes the measurements. The typical mechanism in a CMM is a "bridge"-type arrangement that suspends a probe over the work surface in such a way that the probe can move in three axes. The probe may be a mechanical contact probe or a non-contact probe.

As one example, CMMs are used for quality control in manufacturing. A manufactured part, like a mating bracket, would be fixed and lightly clamped to the work surface using any number of fixtures. The machine would then take the necessary dimensional measurements.

A CMM fixture for holding a part during measurement may include any number of fixturing elements and any number of locating elements. Fixturing elements primarily provide physical support or clamping for the part; locating elements are provided in order to precisely locate or place a part for measurement. One type of locating element is a standoff pin, which can be inserted into a particular hole or opening in a part to locate it precisely.

Each part may present unique fixturing challenges. However, there are some common issues that arise in fixturing. For example, the fixed pitch of the work surface attachment grid can pose problems when none of the grid positions on the work surface would place a fixturing or locating element in the desired position to constrain the part for measurement. Locating or fixturing elements that attach to the work surface at one or several points and provide a sliding track can be used, but these elements are often expensive, small, and can be cumbersome to use.

SUMMARY OF THE INVENTION

One aspect of the invention relates to a locating or fixturing element. The fixturing element has a bottom portion that is adapted to be coupled, directly or indirectly, to a work surface, such as the work surface of a coordinate measuring machine (CMM), or to another fixturing element. The top portion includes a slot or track that extends generally perpendicular to the extent of the fixture. An insert with an element, such as a threaded hole or a pin, is placed in the slot or track such that it can translate horizontally when the fixturing element is in use, allowing the user to selectively position the insert.

Another aspect of the invention also relates to a locating or fixturing element. The fixturing element has a bottom portion that is adapted to be coupled, directly or indirectly, to a work surface, such as the work surface of a coordinate measuring machine (CMM). The top portion includes a slot or track that extends generally perpendicular to the extent of the fixture. An insert with an element, such as a threaded hole or pin, is placed in the slot or track such that it can translate horizontally when the fixturing element is in use, allowing the user to selectively position the insert. The upper sidewall of the fixturing element also includes a generally horizontally-extending side slot that opens into the slot or track. A handle element, such as a pin, is inserted through the side slot and into a complementary opening in the insert, allowing the insert to be moved and positioned from the exterior of the fixturing element.

These and other aspects, features, and advantages of the invention will be set forth in the description that follows.

BRIEF DESCRIPTION OF THE DRAWING FIGURES

The invention will be described with respect to the following drawing figures, in which like numerals represent like features throughout the drawings, and in which.

DETAILED DESCRIPTION

Figure 1:
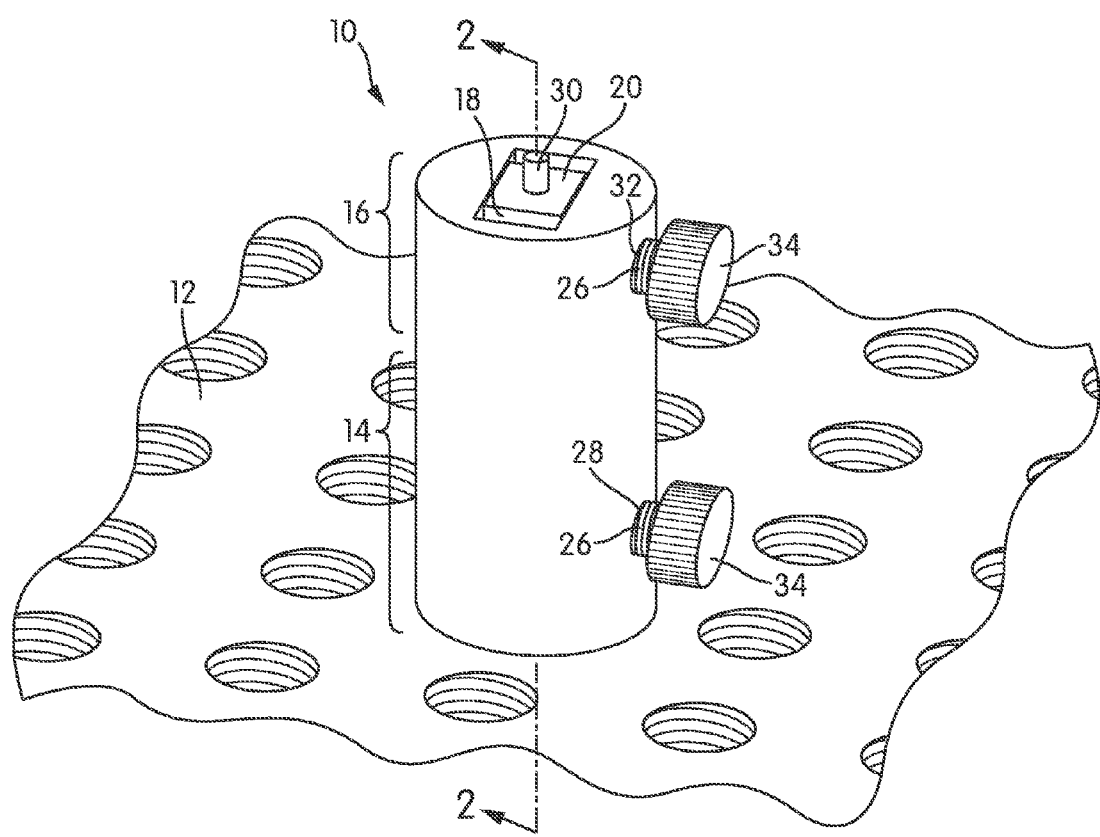
FIG. 1 is a perspective view of a fixturing element according to one embodiment, shown as installed on a work surface with a number of threaded holes arranged in a regular pitch.

FIG. 1 is a perspective view of a fixturing element, generally indicated at 10, according to one embodiment of the invention. As used in this description, the term "fixture" refers to the entire cooperating assemblage of parts that is used to retain a part or piece of equipment in a desired position. Fixtures are comprised of any number of individual elements, which may be fixturing elements (i.e., primarily intended to provide physical support) or locating elements (i.e., primarily intended to locate a part or piece of equipment precisely). In some cases, a fixture may include only a single fixturing or locating element. Because embodiments of fixturing elements 10 according to the present invention share many features whether they are used for fixturing or locating, the two terms may be used interchangeably in this description.

As shown, the fixturing element 10 is coupled to the work surface 12 with a number of threaded holes 13 arranged in a regular pitch. The work surface 12 may be the work surface of a coordinate measuring machine (CMM) in some embodiments, but the fixturing element 10 may be used in any machine or context in which it is useful. In the illustrated embodiment, the fixturing element 10 is generally cylindrical in overall shape, although its shape is not critical and may be different in other embodiments. The fixturing element 10 has a bottom portion 14 that is adapted to couple it to the work surface 12 or to another fixturing element, and a top portion 16 that includes an elongate, generally horizontally-extending slot or track, generally indicated at 18.

The slot or track 18 allows an insert 20, like the pin insert illustrated in FIG. 1, to translate freely within the slot or track 18. The dimensions of the fixturing element 10 and the slot or track 18 may vary from embodiment to embodiment, but ideally, the dimensions are such that the insert 20 can translate freely in a range equal to about half the pitch of threaded holes 13 of the work surface 12. In other words, the fixturing element 10 may be particularly useful for situations in which a relatively small amount of translation is necessary or desired, in order to position a pin, fixture, or other element in the space between two adjacent mounting points on a work surface 12.

Figure 2:
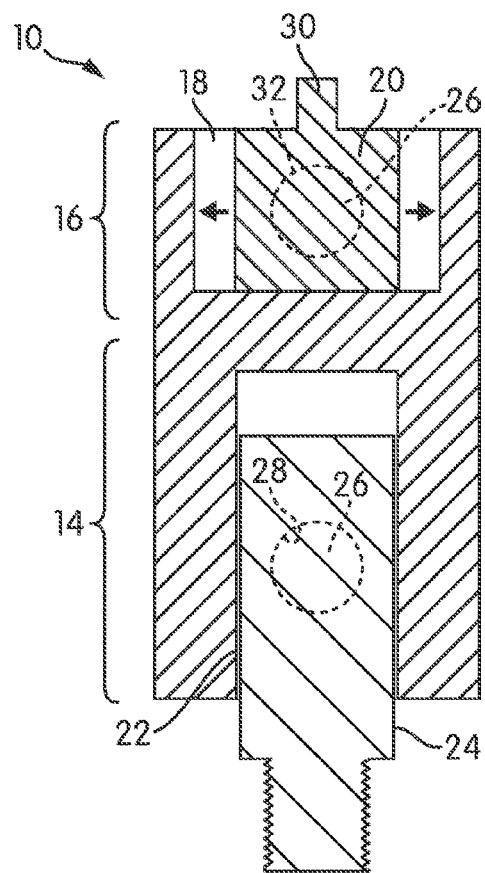
FIG. 2 is a cross-sectional view of the fixturing element of FIG. 1, taken through Line 2-2 of FIG. 1.

FIG. 2 is a cross-sectional view of the fixturing element 10, taken through Line 2-2 of FIG. 1. As shown, the bottom portion 14 includes a cavity 22 that extends along the long axis of the fixturing element 10 and is sized and adapted to receive a post 24, such that the post 24 can slide relatively freely within the cavity 22. A set screw 26 inserts through a threaded side opening 28 in the cavity and bears against or inserts into the post 24 to fix its position relative to the cavity 22. The bottom end of the post 24 in the illustrated embodiment is threaded, allowing it to be secured to the work surface 12. In the illustrated embodiment, the cavity 22 and post 24 are generally cylindrical, which allows the fixturing element 10 to rotate about the post 24, if desired. However, in other embodiments, it may have other shapes that preclude rotation, including square, rectangular, triangular, or any other suitable shape.

The configuration of the bottom portion 14 of the fixturing element 10 may not be critical in all embodiments, and may vary considerably to allow the user multiple options for attaching the fixture to the work surface 12. The cavity 22 and the post 24 illustrated in the figures allow for some degree of vertical translation—i.e., they allow the fixturing element 10 to be raised and lowered relative to the work surface 12. However, that may not be necessary in all embodiments. In some embodiments, for example, the bottom portion 14 could simply include a fixed, threaded post adapted to secure the fixturing element 10 directly to the work surface 12. Of course, the fixturing element 10 itself could be made in essentially any height, or in a variety of heights, to accommodate different size parts and different fixturing needs; however, it is advantageous if the fixturing element 10 is made in sizes that are able to be used with other standard-sized, commercially available fixturing and locating elements and their parts.

As was described briefly above, the slot or track 18 is in the top portion 16 of the fixturing element 10. In the illustrated embodiment, the slot or track 18 is generally rectilinear, although it may have rounded ends or other shapes in other embodiments. In a typical embodiment, if the pitch of the work surface 12 is one inch, the slot or track 18 may be dimensioned to allow the insert 20 about 0.5 inches of translation. Of course, the slot or track 18 may have any length, limited only by the diameter of the fixturing element 10 itself, or at least the diameter of the top portion 16. It should also be understood that although the fixturing element 10 has a constant diameter in the illustrated embodiment, the diameter may vary, and in some embodiments, the diameter at the top portion 16, where the slot or track 18 is located, may be different than the diameter at the bottom portion 14, where the fixturing element 10 attaches to the work surface 12.

Generally speaking, as shown, the slot or track 18 is deep enough to fully seat the insert 20, such that the top of the insert 20 is approximately flush with the top of the fixturing element 10 when fully inserted. In one embodiment, for example, the slot or track 18 may be about 0.5 inches deep. This provides proportions and dimensions similar to the dimensions of a locating or fixturing element without a slot or track 18 and a removable insert 20, and allows the fixturing element 10 to be used as a direct replacement for similar, existing elements. (Of course, a pin 30 or other fixturing element may project upwardly from the insert 20.)

The insert 20 has a size and shape that are generally complementary to the size and shape of the slot or track 18, such that the insert 20 can slide well within the slot or track 18. The insert 20 may have rounded corners, chamfered edges, and other features that may make it easier to manufacture and to handle. A second set screw 26 (best seen in FIG. 1) inserts through an upper threaded side opening 32 in the fixture to bear against and secure the insert 20. The set screws 26 may be of various types and may include structure that allows them to be turned by hand or a socket, e.g., for an Allen wrench. In the illustrated embodiment, the set screws 26 have knobs 34 that can be turned by hand.

Although the illustrated embodiment uses set screws 26 to retain the insert 20 in place, in other embodiments, other methods may be used to secure the insert 20 within the slot or track 18. For example, in some embodiments, the fixturing element 10, or portions of it, may be ferromagnetic, the insert 20 may be ferromagnetic, and the insert 20 may be retained within the slot or track 18 at least partially by magnetic forces. In some cases, that may eliminate the need for a set screw 26, particularly where the weights and/or forces that are expected are relatively light. Of course, depending on the application, a set screw 26 or another mechanism of securement may be used in addition to magnetization.

As was described briefly above, the insert 20 of FIGS. 1 and 2 includes a pin 30. However, many different types of inserts may be used in embodiments of the invention. Generally speaking, each insert will have a body or main portion that inserts into the slot or track 18 and whatever other features are desired. The fixturing or locating features included in the insert may emulate the features of any known or existing fixturing or locating element. For example, inserts 20 according to embodiments of the invention may include standoff pins, threaded holes, adjustable ball joints, cones, magnetic rest pads, clamp parts, adjustable sliding tracks, etc.

Figure 3:
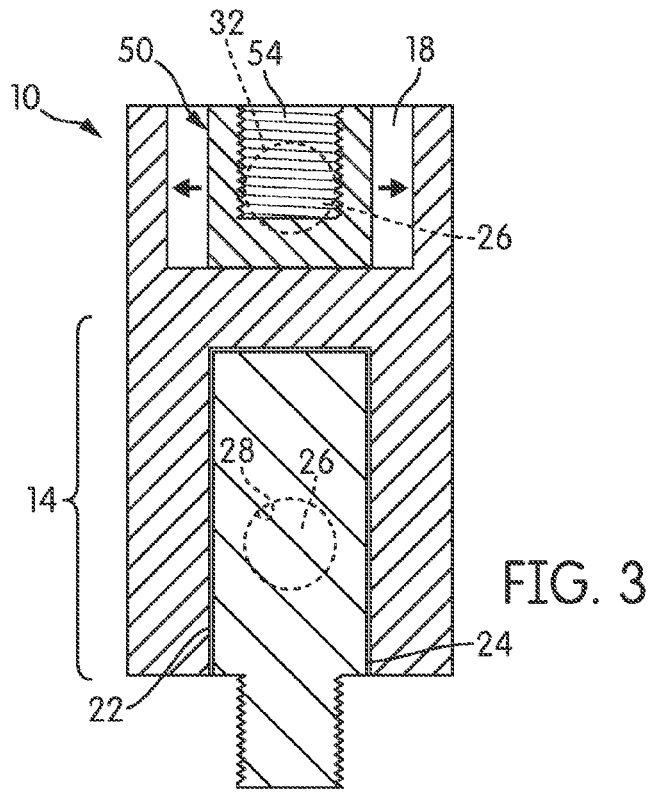
FIG. 3 is a cross-sectional view of a fixturing element according to another embodiment of the invention.

FIG. 3 is a cross-sectional view similar to the view of FIG. 2 illustrating one example of an alternate insert, generally indicated at 50. The insert 50 has a base 52 with the same or approximately the same dimensions as the dimensions of the same features on the insert 20, such that it can fit and slide or be moved within the slot or track 18 in roughly the same way.

Instead of a projecting pin 30, the insert 50 has a threaded hole 54 that is dimensioned to receive and secure other fixturing or locating elements. That allows other components to be movably connected to the insert 50, and thus, held by the fixturing element 10. For example, another fixturing element may be attached by its bottom portion to the insert 50.

As those of skill in the art will appreciate, the arrangement of the slot or track 18 and the inserts 20, 50 allows an insert 20, 50 to be slid within the slot or track 18 to achieve a particular position. This may be done by hand or by using an implement. However, in some embodiments of the invention, it may be helpful to have a more precise mechanism for adjusting the position of the insert 20, 50 along the slot or track 18.

Figure 4:
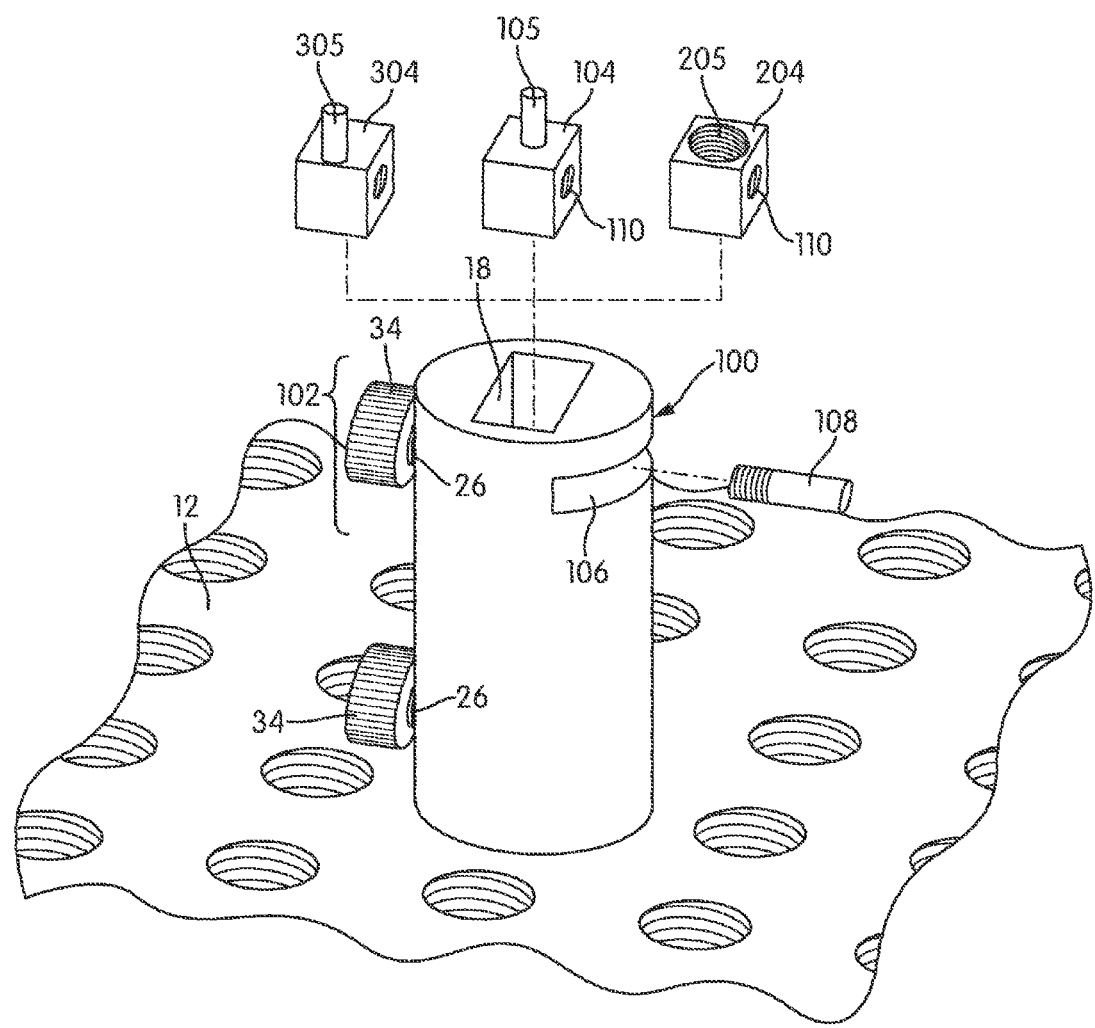
FIG. 4 is an exploded perspective view of a fixturing element according to yet another embodiment of the invention.

FIG. 4 is an exploded perspective view of a fixture, generally indicated at 100, according to another embodiment of the invention. The fixturing element 100 has many of the same features as the fixturing element 10 described above: as shown, a slot or track 18 is formed in an upper portion 102 of the fixturing element 100. As shown, an insert 104 inserts into and slides within the slot or track 18 as described above. The insert 104 includes a vertically-extending standoff pin 105, as in the embodiment of the fixturing element 10 illustrated in FIG. 1; however, an insert may have any configuration, and also shown is an insert 204 that includes a threaded hole 205 in its top surface, rather than a pin 105. Additionally, while the inserts 20, 104, 204 have parts or holes placed in their geometric centers, that need not be the case; FIG. 4 also illustrates an insert 304 with a standoff pin 305 that is located at one end of the insert 304.

The fixturing element 100 also allows a user to change the position of the insert 104 from the exterior of the fixturing element 100. Specifically, there is an additional horizontal slot 106 in the side of the fixturing element 100 in a position such that the horizontal slot 106 opens into the slot or track 18. A pin 108 inserts through the horizontal slot 106 and into a hole 110 in the insert 104, 204, 304 once it is in the slot or track 18. The engagement of the pin 108 and the hole 110 may be frictional, or the pin 108 and hole 110 may have complementary engaging threads or other structures.

Figure 5:
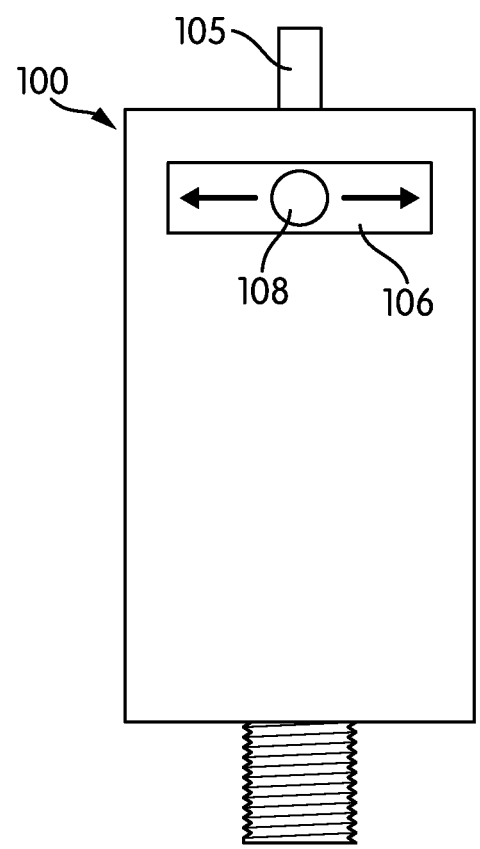
FIG. 5 is a front elevational view of the fixturing element of FIG. 4.

As shown in the side elevational view of FIG. 5, once the insert 104, 204, 304 is seated and the pin 108 installed, the pin 108 can be used to slide the insert 104, 204, 304 back and forth in its slot or track 18. To that end, the horizontal slot 106 typically has a length sufficient to allow the insert 104, 204, 304 to be slid from one end of the slot or track 18 to the other. Of course, any type of handle element may be used to facilitate movement of the insert 104 within the slot or track 18; the pin 108 is only one example. Moreover, in some embodiments, rather than being continuously adjustable, the horizontal slot 106 and the handle element 108 that inserts through the slot 106 and into the hole 110 in the insert may include complementary engaging structures that define a plurality of specific positions for the insert 104, 204, 304.

In most embodiments of the invention, it is advantageous if the fixtures 10, 100 and their inserts 20, 50, 104, 204, 304 are made of a dimensionally stable material that can withstand the expected forces without significant deflection or strain. For example, the fixtures 10, 100 may be made of a metal, such as steel or aluminum. However, in some embodiments, a polymeric material or plastic may be acceptable. For example DELRIN® polyoxymethylene plastic is strong, machinable, thermally stable, and common in CMM applications.

While the invention has been described with respect to certain embodiments, the embodiments are intended to be illuminating, rather than limiting. For example, while embodiments have been described with respect to CMMs, fixtures according to embodiments of the invention may be used with any kind of equipment that includes a work surface with a fixed or variable pitch. In general, modifications and changes may be made within the scope of the invention, which is set forth in the appended claims.

What is claimed is:

1. A fixturing device, comprising:
   a device body having
      a bottom portion, the bottom portion having a generally cylindrical cavity that extends parallel to the extent of the device body and being adapted to couple the device body to a work surface or another fixturing device, and
      a top portion having
         a slot or track within the device body of the fixturing device that extends perpendicular to a longitudinal central axis of the device body, the slot or track having a width and a length, the length being greater than the width, the slot or track being open at a top surface of the device body,
         a hole defined in an outer sidewall of the top portion, the hole extending through the outer sidewall,
         a set screw adapted to be inserted through the hole to releasably secure an insert, the set screw and the hole having complementary engaging structures; and
      the insert being adapted to be inserted into the slot or track so as to slide within the slot or track in a direction perpendicular to the longitudinal axis of the device body.

2. The fixturing device of claim 1, wherein the complementary engaging structures are threads.

3. The fixturing device of claim 1, further comprising:
   a second hole defined in an outer sidewall of the bottom portion of the device body, the hole extending through the outer sidewall of the bottom portion and terminating in the cavity; and
   a second set screw adapted to be inserted through the second hole to releasably secure a post.

4. The fixturing device of claim 1, wherein the device body is generally cylindrical.

5. The fixturing device of claim 1, wherein the slot or track is generally rectilinear.

6. The fixturing device of claim 5, wherein the insert is shaped as a rectangular prism.

7. The fixturing device of claim 1, wherein the insert includes a pin extending from an upper surface thereof.

8. The fixturing device of claim 1, wherein the insert includes a threaded hole in an upper surface thereof.

9. The fixturing device of claim 1, wherein the insert and the slot or track are ferromagnetic and attracted to one another.

10. The fixturing device of claim 1, wherein the insert and the slot or track are dimensioned to allow the insert a range of motion in translation of about 0.5 inches.

11. A fixturing device, comprising:
    a device body having
       a bottom portion, the bottom portion having a generally cylindrical cavity that extends parallel to the extent of the device body and being adapted to couple the device body to a work surface or another fixturing device, and
       a top portion having
          a slot or track within the device body of the fixturing device, that extends perpendicular to a longitudinal central axis of the device body, the slot or track having a width and a length, the length being greater than the width, the slot or track being open at a top surface of the device body,
          a hole defined in an outer sidewall of the top portion, the hole extending through the outer sidewall,
          a set screw adapted to be inserted through the hole to releasably secure an insert, the set screw and the hole having complementary engaging structures, and
          a generally horizontally-extending side slot that extends through a sidewall of the device body along the top portion and opens into the slot or track in a direction perpendicular to the longitudinal axis of the body; and
    an insert being adapted to be inserted into the slot or track so as to slide within the slot or track, an insert having
       a part engaging element positioned to be accessed from the top surface of the device body when the insert is inserted into the slot or track,
       a side opening or slot in a side surface thereof, and
       a handle element adapted to be inserted through the side slot in the top portion and into the side opening.

12. The fixturing device of claim 11, wherein the part engaging element comprises a vertically-extending pin.

13. The fixturing device of claim 11, wherein the part engaging element comprises a threaded hole.

14. The fixturing device of claim 11, wherein the handle element comprises a pin.

15. A fixturing device, comprising:
a device body having
 a top portion having
  a slot or track within the device body of the fixturing device that extends perpendicular to a longitudinal central axis of the device body, the slot or track having a width and a length, the length being greater than the width, the slot or track being open at a top surface of the device body,
  a hole defined in an outer sidewall of the top portion, the hole extending through the outer sidewall, and
  a set screw adapted to be inserted through the hole to releasably secure an insert, the set screw and the hole having complementary engaging structures; and
 a bottom portion having
  a generally cylindrical cavity that extends parallel to the extent of the device body,
  a second hole defined in an outer sidewall of the bottom portion of the device body, the hole extending through the outer sidewall of the bottom portion and terminating in the generally cylindrical cavity, and
  a second set screw adapted to be inserted through the second hole to releasably secure a post,
 the bottom portion being adapted to couple the device body to a work surface or another fixturing device; and
the insert being adapted to be inserted into the slot or track so as to slide within the slot or track in a direction perpendicular to the longitudinal axis of the device body.

* * * * *